United States Patent
Morton et al.

(10) Patent No.: US 8,220,113 B2
(45) Date of Patent: Jul. 17, 2012

(54) SMART CLAMP DEVICE FOR CONNECTING TUBING

(75) Inventors: John E Morton, Peterborough, NH (US); Daniel B Gentle, Jaffrey, NH (US)

(73) Assignee: HITCO, Ltd., Oyster Bay, NY (US)

( * ) Notice: Subject to any disclaimer, the term of this patent is extended or adjusted under 35 U.S.C. 154(b) by 0 days.

(21) Appl. No.: 13/155,507

(22) Filed: Jun. 8, 2011

(65) Prior Publication Data

US 2012/0126534 A1    May 24, 2012

Related U.S. Application Data

(60) Provisional application No. 61/415,438, filed on Nov. 19, 2010.

(51) Int. Cl.
*F16L 23/10* (2006.01)
(52) U.S. Cl. ............. 24/284; 248/58; 285/411; 285/420
(58) Field of Classification Search ............. 24/284; 248/58; 285/411, 420
See application file for complete search history.

(56) References Cited

U.S. PATENT DOCUMENTS

| | | | |
|---|---|---|---|
| 167,262 A * | 8/1875 | Lewis ........................... 24/285 |
| 2,689,141 A | 9/1954 | Kiekhaefer | |
| 3,966,240 A * | 6/1976 | Enomoto ..................... 285/367 |
| 4,568,115 A * | 2/1986 | Zimmerly .................... 285/411 |
| 4,657,284 A * | 4/1987 | Fiori ............................. 285/39 |
| 4,739,542 A * | 4/1988 | Krzesicki ..................... 24/285 |
| 4,819,924 A | 4/1989 | Yang | |
| 5,454,606 A * | 10/1995 | Voss et al. ................... 285/367 |
| 5,509,702 A * | 4/1996 | Warehime et al. ........... 285/409 |
| 5,522,625 A * | 6/1996 | Flick et al. ................... 285/409 |
| 5,645,303 A | 7/1997 | Warehime et al. | |
| 5,653,481 A * | 8/1997 | Alderman .................... 285/363 |
| 5,842,526 A * | 12/1998 | Archer et al. ................. 169/56 |

(Continued)

FOREIGN PATENT DOCUMENTS

GB    873867 A    7/1961

(Continued)

OTHER PUBLICATIONS

UK Intellectual Property Office Search Report for Application No. GB1103381.8, May 19, 2011, 1 page.

(Continued)

*Primary Examiner* — Robert J Sandy
*Assistant Examiner* — David Upchurch
(74) *Attorney, Agent, or Firm* — Maine Cernota & Rardin

(57) ABSTRACT

A hinged clamp provides quick connection and disconnection of sections of fluid tubing. Some embodiments include a spring-loaded catch mechanism that enables the clamp to be loosely latched, and a winding mechanism that can retract the catch to a securely latched condition. Other embodiments provide a hinged shaft that pivots about an end of the upper clamp ring. A middle section of the shaft can be inserted into a slotted opening in the lower clamp ring, and the winding mechanism can move an engagement surface against the lower clamp ring to securely latch the clamp. An adjustment mechanism is included in these embodiments which can adjust the amount of winding required to engage the clamp. In various embodiments, less than one turn or less than one-half turn is required to engage/disengage the clamp. The clamp can be openable only just enough for insertion of flanged ends of the tubing sections.

8 Claims, 13 Drawing Sheets

U.S. PATENT DOCUMENTS

| | | | |
|---|---|---|---|
| 5,873,611 A * | 2/1999 | Munley et al. | 285/367 |
| 6,030,006 A * | 2/2000 | Lin | 285/411 |
| 6,056,332 A * | 5/2000 | Foster | 285/367 |
| D438,783 S * | 3/2001 | Elliott | D8/396 |
| 6,523,866 B2 * | 2/2003 | Lin | 285/410 |
| 6,708,377 B2 * | 3/2004 | Maunder | 24/279 |
| 6,991,414 B1 * | 1/2006 | Mensah | 411/231 |
| 7,644,960 B2 * | 1/2010 | Casey et al. | 285/367 |
| 2005/0056707 A1 * | 3/2005 | Gowens et al. | 239/112 |
| 2005/0212291 A1 * | 9/2005 | Edwards | 285/364 |
| 2006/0197344 A1 | 9/2006 | Henry | |
| 2007/0138351 A1 | 6/2007 | Wu | |
| 2009/0096210 A1 * | 4/2009 | Maunder | 285/411 |

FOREIGN PATENT DOCUMENTS

| | | |
|---|---|---|
| GB | 2446813 A | 8/2008 |
| JP | 8178147 | 7/1996 |
| JP | 2006167894 A | 6/2006 |
| WO | WO 2009146764 A1 * | 12/2009 |

OTHER PUBLICATIONS

UK Intellectual Property Office Search Report for Application No. GB1112121.7, Oct. 27, 2011, 1 page.

UK Intellectual Property Office Further Search Report for Application No. GB1112121.7, Dec. 8, 2011, 2 pages.

* cited by examiner

SMART CLAMP DEVICE FOR CONNECTING TUBING

RELATED APPLICATIONS

This application claims the benefit of U.S. Provisional Application No. 61/415,438, filed Nov. 19, 2010, which is herein incorporated by reference in its entirety for all purposes.

FIELD OF THE INVENTION

The invention relates to couplings for connecting fluid systems, and more particularly to sanitary hygienic fittings for connecting sanitary tubing and systems.

BACKGROUND OF THE INVENTION

Sanitary couplings are used in applications such as the food processing, dairy, beverage, pharmaceutical, and biotechnology industries, where fluid lines and couplings must be configured so as to prevent fluid entrapment and minimize opportunities for bacteria to lodge and multiply. This requirement limits the materials, surface finishes, and physical configurations that can be used. Typically, sanitary tubes and fittings are made from rigid metals such as brass and stainless steel, and are polished to a highly smooth finish. Coupling gaskets can be made from metal, or from certain polymers such as Nylon or Teflon.

Common sanitary fluid couplers rely on manual clamps to secure components together, as is illustrated in prior art FIG. 1, commonly referred to as a Tri-Clamp. Conventional Tri-Clamps have an upper and a lower ring section 116 that are connected on a hinged joint so that the clamp assembly 114 can open and close. Two sections of tubing 104, 106, which are to be joined, need to be held together along with an intervening gasket 112 while the clamp 114 is closed over them such that the flanged ends 108, 110 of the tubing are received within slotted groves on the inner diameter of the clamp rings 116. The clamp 114 is then secured by turning a tightening bolt 118 through many revolutions until the necessary clamping pressure is achieved.

There are a number of drawbacks to the conventional Tri-Clamp device as illustrated in FIG. 1. First, the clamp tends to easily fall into a wide open position, making it awkward and time consuming to close the clamp around the tubing sections using just one hand while holding the tubing section together with the other hand. Second, after closing the clamp around the tubing sections, the clamp has to be firmly held in the closed position with one hand while the tightening bolt is maneuvered into position with the other hand and then rotated through many turns to secure the clamp. This process can be time consuming, inefficient and error prone. In typical industrial and commercial settings there can be very large numbers of tubing sections that need to be connected, disconnected and re-arranged on a frequent basis.

What is needed, therefore, is a sanitary fluid system connector which allows for rapid and efficient connection and disconnection of tubing sections.

SUMMARY OF THE INVENTION

One general aspect of the present invention is a sanitary fluid system coupling or connector which allows for rapid and efficient connection and disconnection of tubing sections.

In embodiments of the invention, two tube sections may be coupled together by joining them at their flanged ends with an intervening gasket and inserting the flanged ends into the grooved slots in the clamp rings which are opened to a maximum open position. The maximum open position is the minimum amount necessary to insert the flanged tube ends. Upper and lower sections of a clamp ring may then be loosely closed around the flanges, requiring a minimal pivot of the upper clamp ring towards the lower ring clamp. A catch mechanism is then pivoted within the lower ring clamp such that a hooked paw at the end of the catch rotates away from a latch on the upper ring clamp while being pushed upwards so that the hooked paw clears the latch. After clearing the latch, the catch mechanism is then pivoted back towards the latch so that the hooked paw engages the latch with the aid of spring mechanisms to provide a first, loosely latched condition. A winding mechanism which is attached to the catch mechanism is then rotated one revolution or less, clockwise by means of the winding handle to retract the catch mechanism and fully secure the latch.

To disconnect the tubes, the winding mechanism is rotated one revolution, or less, counter-clockwise to advance the catch mechanism back into the loosely latched condition. The catch mechanism is then pushed further upwards and pivoted away from the latch to disengage. The ring clamps can then be opened and the tube sections removed.

In another general aspect of the present invention, a shaft is connected at its distal end to the upper clamp ring section at a pivot joint. The shaft can pivot downward so that when the clamp ring is nearly closed a mid-section of the shaft can be received in a slotted opening on an end of the lower clamp ring section. A winding mechanism is cooperative with the proximal end of the shaft, and can be wound so as to move an engagement surface along an axis of the shaft up from beneath the lower clamp ring section until the engagement surface presses against the lower clamp ring section and secures the clamp ring in a closed configuration.

A fine adjustment mechanism is cooperative with the engagement surface and/or the winding mechanism. In embodiments, manipulation of the fine adjustment mechanism adjusts the position of the engagement surface along the shaft, and thereby enables the clamp ring to be fully engaged by means of a single rotation or less of the winding mechanism.

The combination of the fine adjustment and coarse winding mechanism allows the clamp to be tailored to a particular set of tubes with flanged ends, gaskets and ferrels. Since gaskets and ferrels can vary slightly in dimension and compress over time, the fine adjustment mechanism allows the clamp to be adjusted in various embodiments to a click-stop position which is pre-set for a particular tubing combination, which in turn allows for fast and efficient securing and removing of the clamp connection repeatedly and with less than one turn of the coarse winding mechanism.

In embodiments, the upper and lower clamp ring sections are openable only just enough for insertion of flanged ends of the tubing sections. In some embodiment, a restraint mechanism is included which prevents unintentional rotation of the winding mechanism and unintentional release of the clamp.

In various embodiments, the rapid and efficient tightening and locking adjustment features of the present invention can be applied to a wide range of devices in addition to clamps. For example, various machine tools such as turning and milling machines, both manual and computer controlled, require numerous adjustments during the setup process. These adjustments can be performed more easily and efficiently with the tightening and locking features of the present invention. Similarly, many types of hand tools and power tools, such as routers, table saws and chop saws, require tightening and locking adjustments of various components, and are amenable to improved operation due to embodiments of the present invention.

One general aspect of the present invention is a coupling device for connecting sections of fluid tubing. The coupling device includes an upper clamp ring and a lower clamp ring attached to the upper clamp ring at a hinge joint, allowing the upper clamp ring and the lower clamp ring to rotate about the hinge joint between an open position and a closed position. The coupling device further includes a catch mechanism having a lower end fitted through an opening in the lower clamp ring, the catch mechanism having an upper end extending beyond the opening in the lower clamp ring and extendable into a receiver opening in the upper clamp ring, a latch located within the receiver opening.

A hooked paw on the upper end of the catch mechanism is configured for engaging with the latch during an initial closure of the coupling device, thereby providing a first, loosely latched condition. The coupling device further includes a spring located in the receiver and configured to encourage engagement of the hooked paw with the latch during the initial closure into the loosely latched condition.

A winding mechanism is attached to the lower end of the catch mechanism and rotatable over a limited range about an axis of the catch mechanism so as to move the catch mechanism up and down along the axis of the catch mechanism, thereby retracting the catch mechanism and fully securing the latch when the winding mechanism is rotated so as to move the catch mechanism in the down direction, and thereby releasing the catch mechanism and returning the coupling device to the loosely latched condition when the winding mechanism is rotated so as to move the catch mechanism in the up direction. Furthermore, the coupling mechanism includes a spring loaded pivot point in the lower clamp ring about which the winding mechanism and catch mechanism can be rotated to engage and disengage the coupling device from the loosely latched condition, wherein the spring loading encourages the engagement of the hooked paw with the latch.

Embodiments further include a clamp ring pivot stop configured to limit the angle between the lower clamp ring and upper clamp ring about the hinge joint in the open position. In some embodiments the winding mechanism requires no more than one full turn to fully secure the latch. In other embodiments, the winding mechanism requires no more than one full turn to release the catch mechanism.

Various embodiments further include a restraint mechanism configured to prevent unintentional rotation of the winding mechanism causing unintentional release of the coupling device.

In certain embodiments the attachment of the winding mechanism and the catch mechanism is accomplished with a threaded rod on the winding mechanism and a threaded receiver on the catch mechanism, and wherein the threading is an ACME thread to provide smooth and rapid motion of the catch mechanism in response to rotation of the winding mechanism.

In some embodiments, slotted grooves are provided in the inner diameters of both the upper and lower clamp rings, the slotted grooves being configured to receive and secure a gasket between flanged ends of the sections of fluid tubing.

In other embodiments the coupling device is made from stainless steel, plastic, or nylon.

Another general aspect of the present invention is a coupling device for connecting sections of fluid tubing. The coupling device includes an upper clamp ring and a lower clamp ring attached to the upper clamp ring at a hinge joint, allowing the upper clamp ring and the lower clamp ring to rotate about the hinge joint. The coupling device further includes a shaft having a distal end pivotally connected to the upper clamp ring, a mid-section which is receivable into a slotted opening in the lower clamp ring, and a proximal end extending below the slotted opening when the mid-section is inserted in the slotted opening.

The coupling device also includes a winding mechanism cooperative with the proximal end of the shaft and rotatable over a limited winding range so as to move an engagement surface along an axis of the shaft between an engaged position and an unengaged position, the engagement surface in the engaged position being able to apply to the lower clamp ring a force which is sufficient for securely engaging the upper clamp ring with the lower clamp ring, thereby firmly joining together the sections of fluid tubing.

Furthermore, the coupling device includes an adjustment mechanism cooperative with the engagement surface, the adjustment mechanism being rotatable so as to adjust the size of the limited winding range, thereby adjusting the amount of rotation of the winding mechanism that is required to transition the engagement surface from the unengaged position to the engaged position.

In various embodiments, the adjustment mechanism clicks into a plurality of preset adjustment positions about a limited range of adjustment rotation. In some embodiments, rotation of the fine adjustment mechanism is able to move the engagement surface along the axis of the shaft over a limited adjustment range, the limited adjustment range having a magnitude of between 60 thousandths of an inch and 70 thousandths of an inch. In other embodiments no more than one half turn of the winding mechanism is required to move the engagement surface between the engaged position and the unengaged position.

Certain embodiments further include a clamp ring pivot stop configured to limit the range of rotation of the upper clamp ring and the lower clamp ring about the hinge joint in the open position.

In various embodiments slotted grooves are provided in the inner diameters of both the upper and lower clamp rings, the slotted grooves being configured to receive and secure a gasket between flanged ends of the sections of fluid tubing. In some embodiments the coupling device is suitable for use in a sanitary fluid system. And in other embodiments the coupling device is made from one of stainless steel, plastic, and nylon.

Yet another general aspect of the present invention is an adjustable tightening device which includes a shaft having a distal end which is connectable to an object to be secured and a proximal end which is insertable into a receiving object. The tightening device further includes a winding mechanism cooperative with the proximal end of the shaft and rotatable over a limited winding range so as to move an engagement surface along an axis of the shaft between an engaged position and an unengaged position, the engagement surface in the engaged position being able to apply to the receiving object a force which is sufficient for securely engaging the connectable object with the receiving object. The tightening device also includes an adjustment mechanism cooperative with the engagement surface, the adjustment mechanism being rotatable so as to adjust the size of the limited winding range, thereby adjusting the amount of rotation of the winding mechanism that is required to transition the engagement surface from the unengaged position to the engaged position.

In various embodiments the winding mechanism requires no more than one full turn to fully secure the latch. In some embodiments, the winding mechanism requires no more than one full turn to release the catch mechanism. And other embodiments further include a restraint mechanism configured to prevent unintentional rotation of the winding mechanism causing unintentional release of the coupling device.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The invention is susceptible of many embodiments. What follows is illustrative, but not exhaustive of the scope of the invention.

An embodiment of the present invention comprises a sanitary fluid system coupling or connector which allows for rapid and efficient connection and disconnection of tubing sections.

Figure 1:
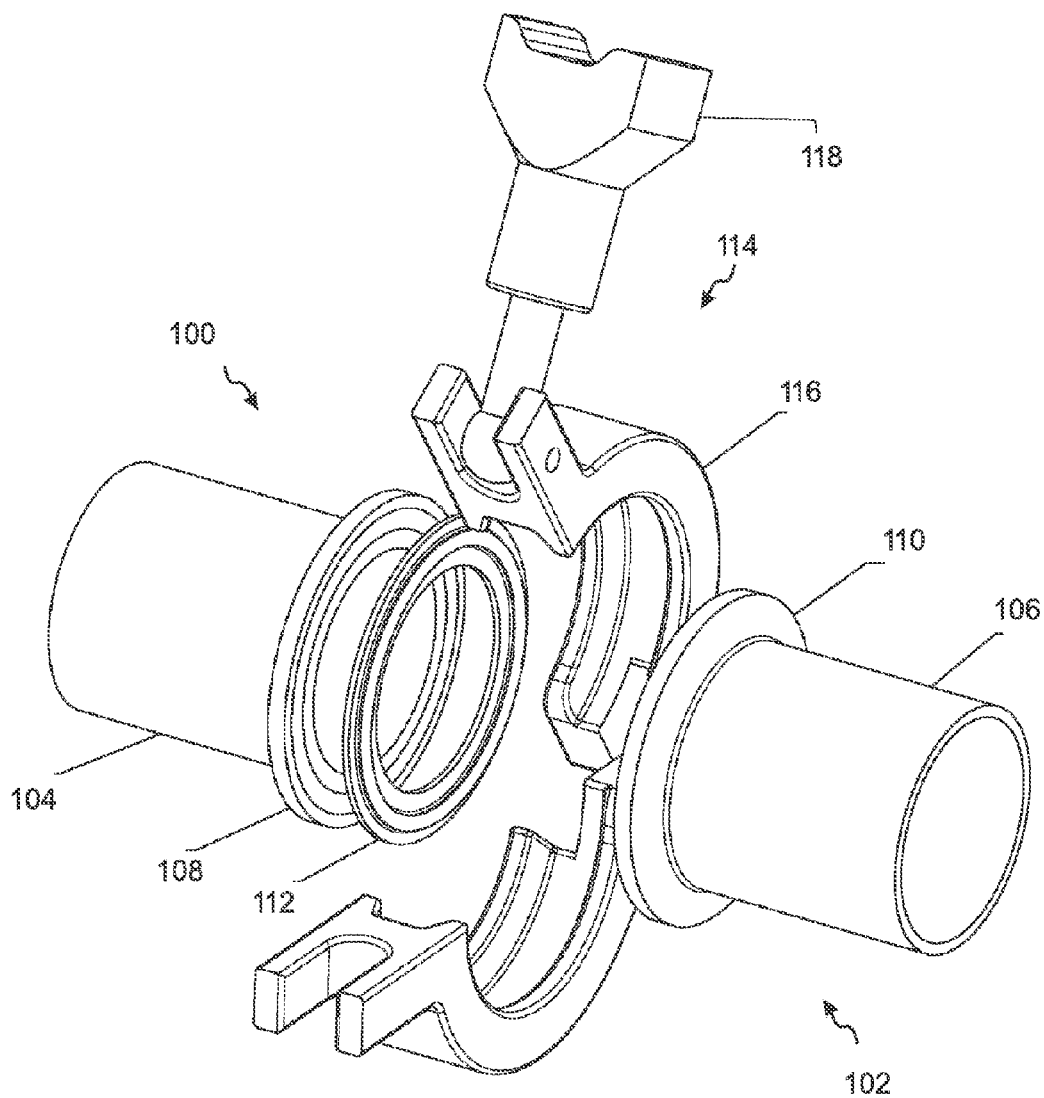
FIG. 1 is a perspective view of a prior art clamp-and-gasket sanitary fitting commonly called a Tri-Clamp.

With reference to FIG. 1, sanitary fittings are typically made from rigid metals such as brass and stainless steel, which are polished to a highly smooth interior finish so as to prevent fluid entrapment and attachment of bacteria to surface roughness. FIG. 1 illustrates a typical sanitary clamp-and-gasket fitting of the prior art commonly known as a "Tri-Clamp." The fitting comprises two sections 100, 102, each of which includes a straight length of tubing 104, 106 terminating in a flange 108, 110 at a proximal end of the fitting 100, 102. The sections 100, 102 are joinable by trapping a gasket 112 between the flanges 108, 110 and coupling the flanges 108, 110 to each other with a clamp 114. The clamp 114 includes a split hollow ring 116 and a tightening bolt 118 which can be engaged with the open ends of the split ring 116 and manually tightened so as to press the flanges 108, 110 toward each other and against the gasket 114. The two sections 100, 102 are typically made of metal, such as stainless steel, and the coupling gasket can be made from metal or from certain polymers such as plastic, Nylon or Teflon.

Figure 2:
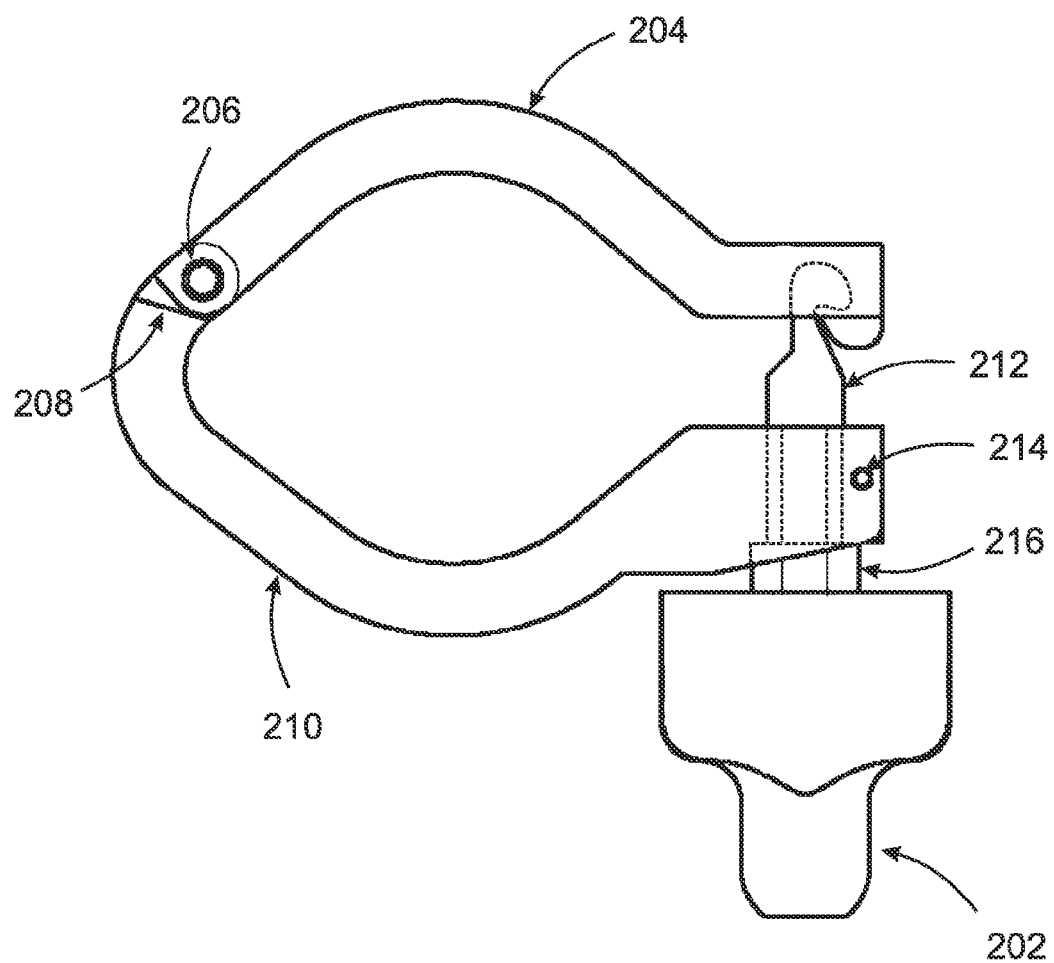
FIG. 2 is a side view of an improved Tri-Clamp device in the closed position, according to a first embodiment of the invention.

With reference to FIG. 2, a side view of an improved Tri-Clamp device in an embodiment of the present invention is illustrated in the closed position. The device comprises an upper clamp ring 204 and a lower clamp ring 210 connected at a hinge joint 206 enabling the clamp ring sections 204, 210 to rotate from open to closed positions about the hinge joint 206. A clamp ring pivot stop 208 limits the rotational range of motion of the clamp ring sections about the hinge joint 206. A catch mechanism 212 extends through the lower ring clamp 210 into the upper ring clamp 204. A winding mechanism 216 is attached to the lower end of the catch mechanism 212. A winding mechanism handle 202 is attached to the lower end of the winding mechanism 216. The combination winding mechanism and catch mechanism assembly 216, 212 may rotate about a pivot point 214 as part of the clamp closure engagement process which is described in greater detail below. The combination winding mechanism and catch mechanism assembly 216, 212 may also move over a limited range in the up-and-down direction as part of the engagement process.

Figure 3:
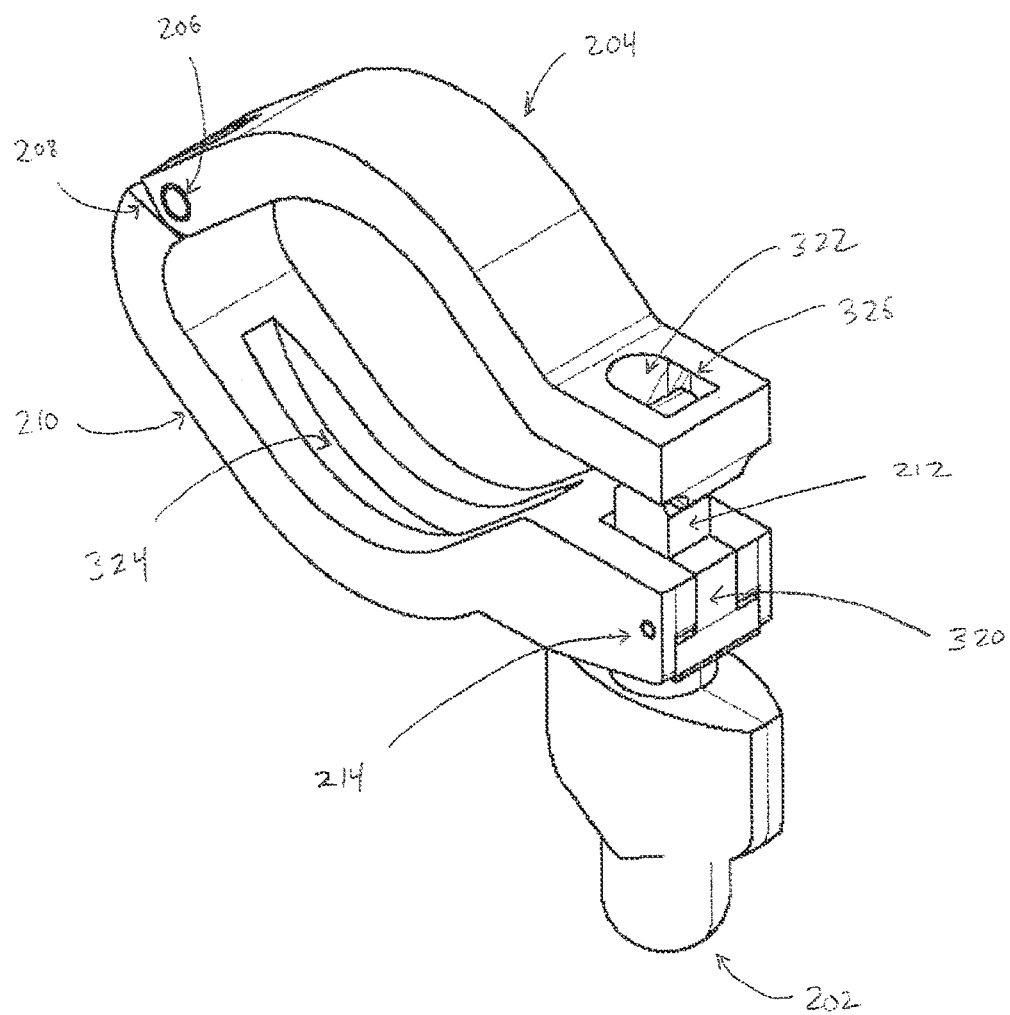
FIG. 3 is a perspective view of the improved Tri-Clamp device of FIG. 2 in the closed position.

With reference to FIG. 3, a perspective view of the improved Tri-Clamp device of FIG. 2 is illustrated in the closed position. Some additional details are shown over those in FIG. 2. A slotted groove 324 in the lower clamp ring 210 securely holds the flanged ends of the tubing sections to be coupled. A similar groove, not shown in this view, exists in the upper clamp ring 204.

A receiver 326 in the upper clamp ring 204 receives the upper end of the catch mechanism 212. A spring 322 in the receiver 326 encourages engagement of a hooked paw on the end of the catch mechanism (430 in FIG. 4, discussed in more detail below) onto a latch (432 in FIG. 4, discussed in more detail below). Another spring 320 in the lower clamp ring 210 encourages rotation of the combination winding mechanism and catch mechanism assembly 216, 212 about pivot point 214 in the direction of engagement of the hooked paw 430 onto the latch 432. The combination winding mechanism and catch mechanism assembly 216, 212 may also move over a limited range in the up-and-down direction, and spring 320 tends to resist such motion. Movement of the assembly 216, 212 in the up direction, against the resistance of spring 320 allows for release of the hooked paw 430 from the latch 432.

Figure 4:
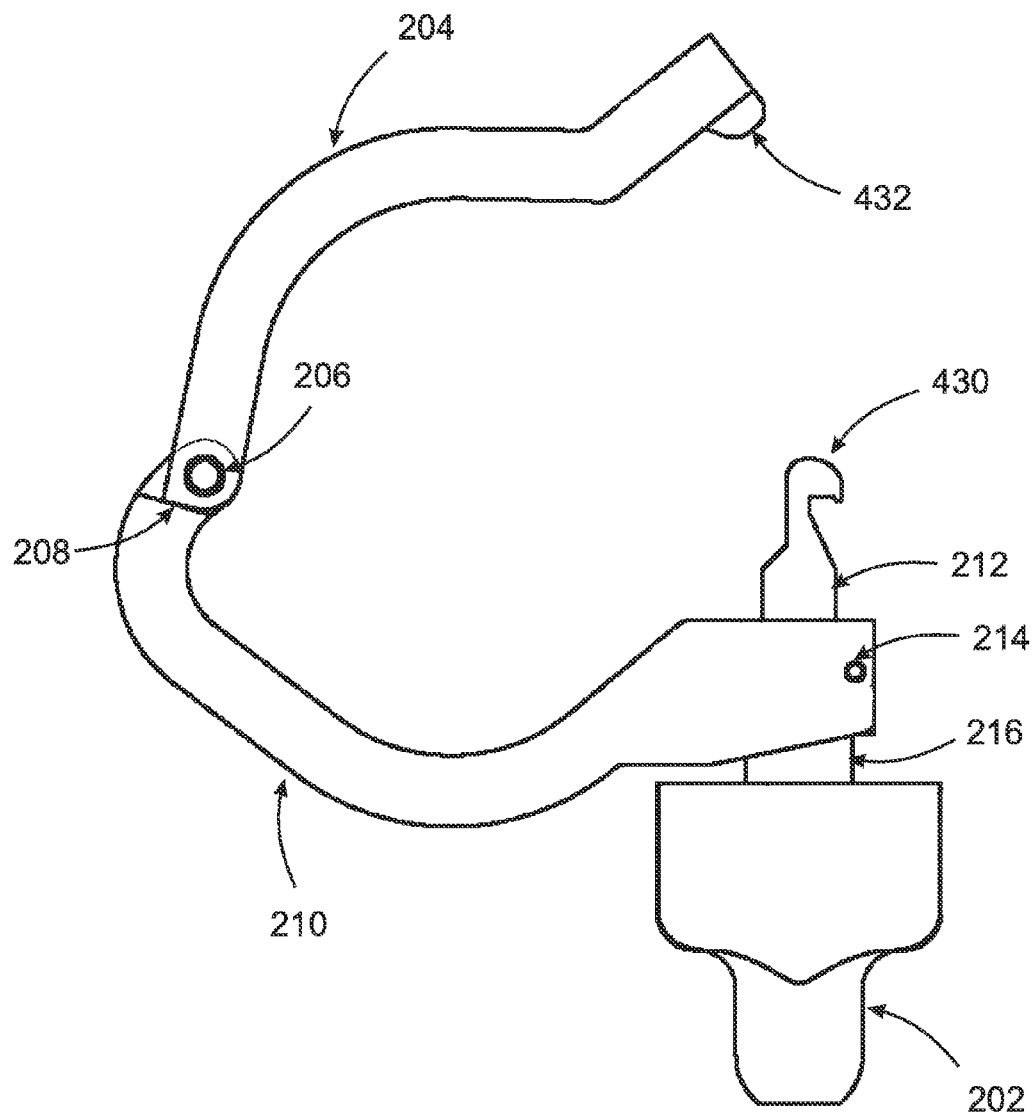
FIG. 4 is a side view of the improved Tri-Clamp device of FIG. 2 in the open position.

With reference to FIG. 4, a side view of the improved Tri-Clamp device of FIG. 2 is illustrated in the open position. Additional details are shown over those in previous figures. Hooked paw 430 on the end of the catch mechanism 212 engages with latch 432 on the end of upper clamp ring 204.

Figure 5:
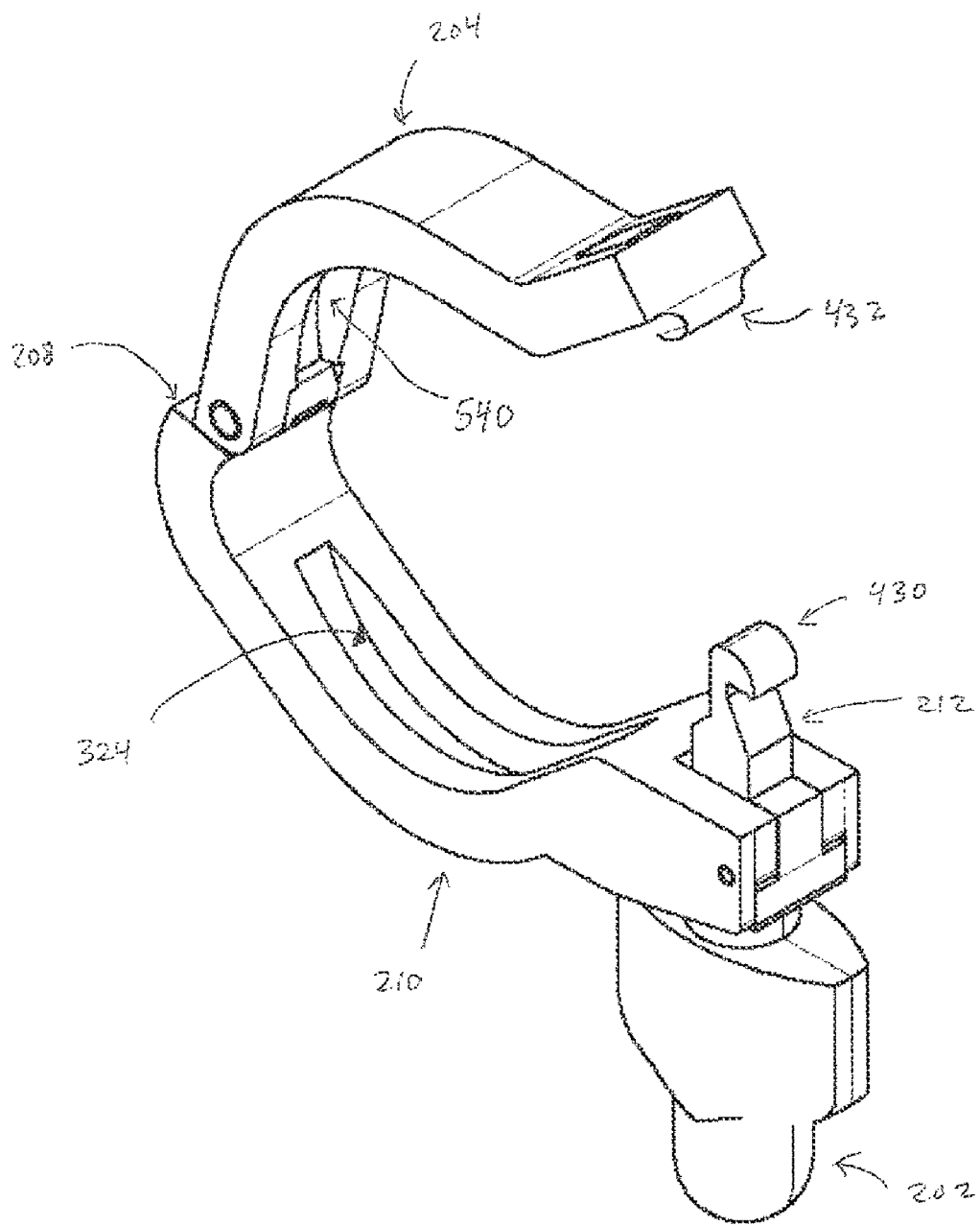
FIG. 5 is a perspective view of the improved Tri-Clamp device of FIG. 2 in the open position.

With reference to FIG. 5, a perspective view of the improved Tri-Clamp device of FIG. 2 is illustrated in the open position. Additional details are shown over those in previous figures. This figure illustrates slotted groove 540 in the upper clamp ring 204 which, along with slotted groove 324 in the lower clamp ring 210, securely holds the flanged ends of the tubing sections to be coupled. The Figure also illustrates the shape of catch 432.

Figure 6:
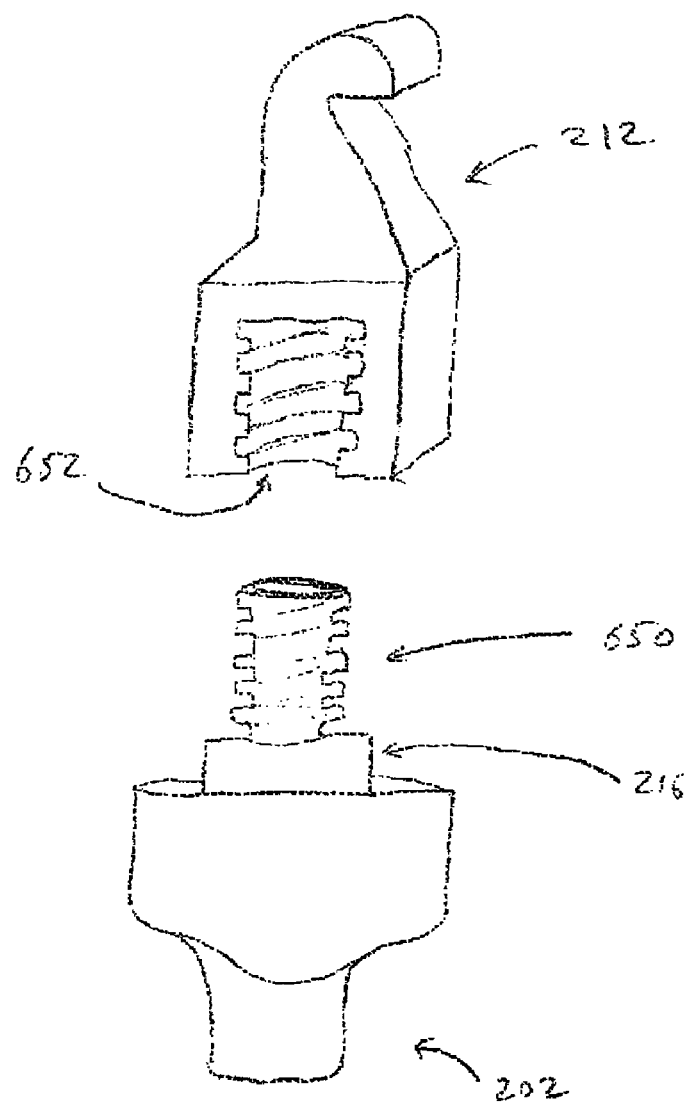
FIG. 6 is a perspective view of the catch mechanism and winding mechanism of the improved Tri-Clamp device of FIG. 2.

With reference to FIG. 6, a perspective view of the catch mechanism and winding mechanism of the improved Tri-Clamp device of FIG. 2 is illustrated. Winding mechanism 216 ends in a threaded rod 650 comprising ACME threads which are coarse and square to provide for smooth and rapid advancement of the winding mechanism 216 with each rotation. Catch mechanism 212 has a threaded receiver 652 with matching ACME threads to permit attachment of winding mechanism 216 and catch mechanism 212, and to provide up-and-down advancement/retraction motion of catch mechanism 212 in response to rotation of winding mechanism 216.

In various embodiments of the invention, two tubes such as the tubes 104, 106 from FIG. 1 are coupled together by joining them at their flanged ends 108, 110 with an intervening gasket 112 and inserting the flanged ends 108, 110 into the grooved slots 324, 540 in the clamp rings 204, 210 which are opened to a maximum open position as determined by the pivot stop 208. The clamp rings 204, 210 are then loosely closed around the flanges 108, 110, requiring a minimal pivot of the upper clamp ring 204 towards the lower clamp ring 210. The catch mechanism 212 is then pivoted such that the hooked paw 430 rotates away from the latch 432 while being pushed upwards so that the hooked paw 430 clears the latch 432. After clearing the latch 432, the catch mechanism 212 is then pivoted back towards the latch 432, so that the hooked paw 430 engages the latch 432 with the aid of the spring mechanisms 320, 322 so as to provide a first, loosely latched condition. The winding mechanism 216 is then rotated one revolution or less in a clockwise direction by means of the winding handle 202 so as to retract the catch mechanism 212 and fully secure the latch 430.

To disconnect the tubes 104, 106, the winding mechanism 216 is rotated one revolution or less in a counter-clockwise direction so as to advance the catch mechanism 212 back into the loosely latched condition. The catch mechanism 212 is then pushed further upwards and pivoted away from the latch 432 so as to disengage the hooked paw 430 from the latch 432. The clamp rings 204, 210 can then be opened and the tube sections 104, 106 removed.

Figure 7:
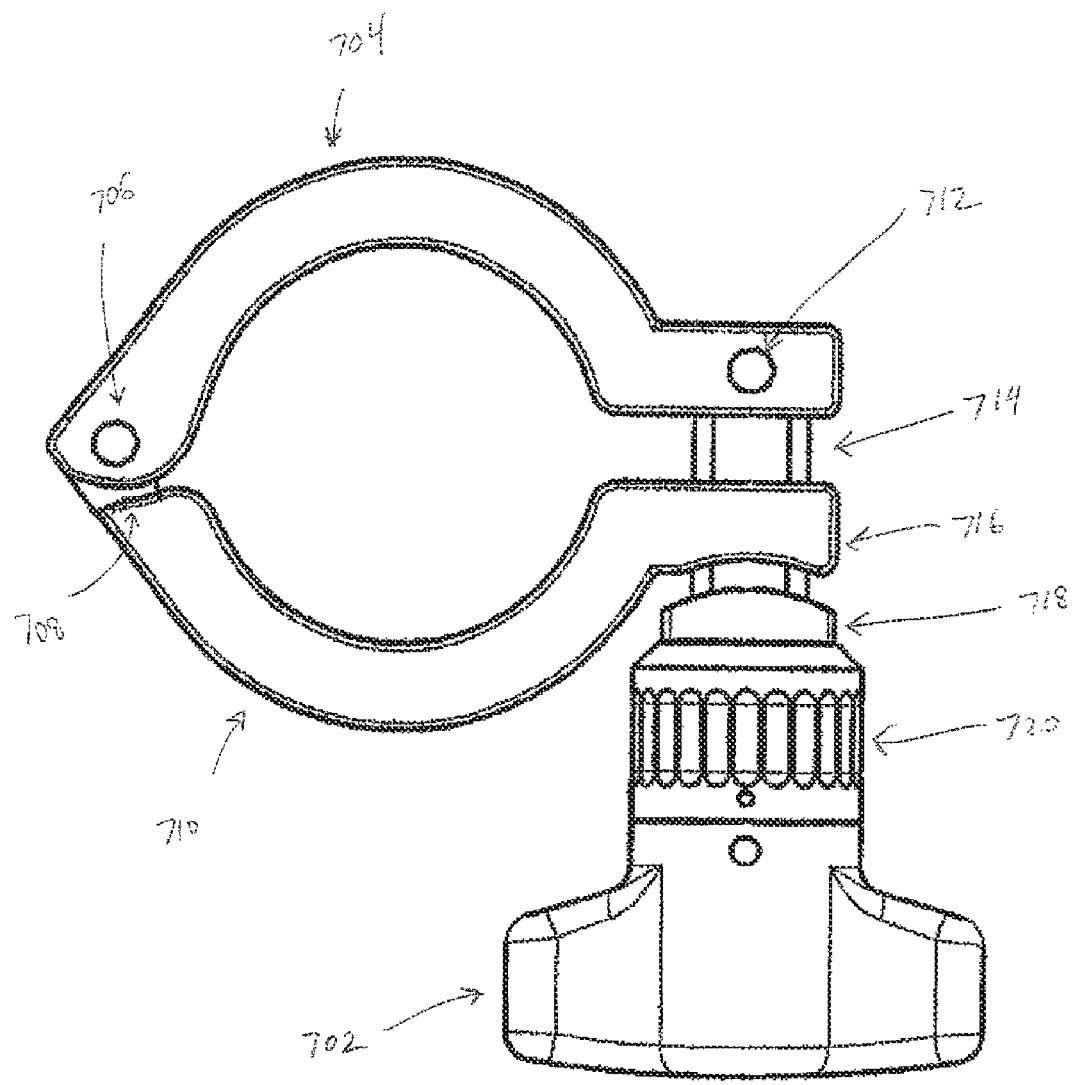
FIG. 7 is a side view of an improved Tri-Clamp device in the closed position, according to a second embodiment of the invention.
Figure 8:
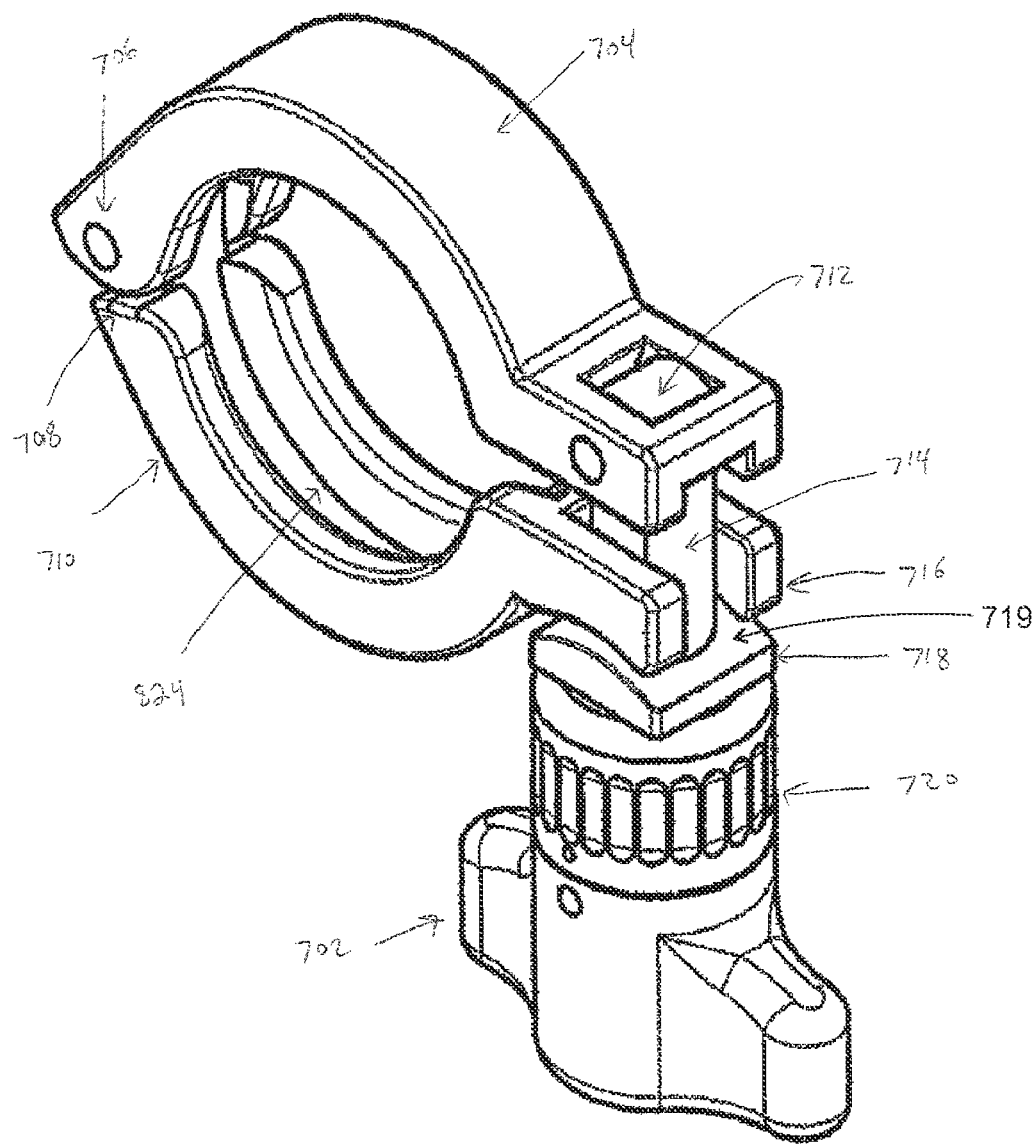
FIG. 8 is a perspective view of an improved Tri-Clamp device in the closed position, according to the embodiment of FIG. 7.

FIGS. 7 and 8 are side and perspective views, respectively, of an alternate embodiment of the present invention shown with the clamp in the closed position. The device comprises an upper clamp ring section 704 and a lower clamp ring section 710 connected to each other by a hinge joint 706 which enables the clamp ring sections 704, 710 to rotate between open and closed positions about the hinge joint 706. A clamp ring pivot stop 708 limits the rotational range of motion of the clamp ring sections about the hinge joint 706. Both the upper and lower clamp rings sections 704, 710 include slotted groves 824 on the surfaces of the inner diameters of the ring sections 704, 710 so as to receive and secure the gasket 112 and flanged ends 108, 110 of the tubing sections 100, 102 to be joined.

A shaft 714 is connected to upper clamp ring 704 at a pivot joint 712. The shaft 714 extends downward through curved tines of a slotted opening 716 in the lower clamp ring 710. The shaft 714 then further extends downward into a receiver opening in a curved engagement block 718.

A fine adjustment mechanism 720 is attached to the curved engagement block 718. Rotation of the fine adjustment mechanism 720 adjusts the position of the curved engagement block 718 along the shaft 714, and thereby enables the engagement surface 719 of the curved engagement block 718 to be securely engaged against the curved tines of the slotted opening 716 in the lower clamp ring 710 by means of a single rotation or less of the coarse winding mechanism 702.

The fine adjustment mechanism 720 may have click stops or locking positions along its limited range of rotation so that it can quickly be set to or held in one of a number of preset adjustment positions. In embodiments, The range of rotation of the fine adjustment mechanism 720 allows for movement of the curved engagement block 718 in an up or down direction along the axis of the shaft 714 over an approximate range of 60 thousandths of an inch to 70 thousandths of an inch.

The coarse winding mechanism 702 is attached to the fine adjustment mechanism 720 and is also rotatable, resulting in movement of the curved engagement block 718 in an up-and-down direction along the axis of the shaft 714, and enabling the curved engagement block 718 to be securely engaged against the curved tines of the slotted opening 716 in the lower clamp ring 710 during device closure.

In embodiments, the coarse winding mechanism 702 enables the clamp to be secured in the closed position with a rotation of approximately one half turn or less.

The combination of the fine adjustment 720 and coarse winding mechanism 702 allows the clamp to be tailored to a particular set of tubes with flanged ends, gaskets and ferrels. Since gaskets and ferrels can vary slightly in dimension and compress over time, the fine adjustment mechanism 720 allows the clamp to be adjusted in various embodiments to a click-stop position which is pre-set for a particular tubing combination, which in turn allows for fast and efficient securing and removing of the clamp connection repeatedly and with just a half-turn of the coarse winding mechanism.

Figure 9:
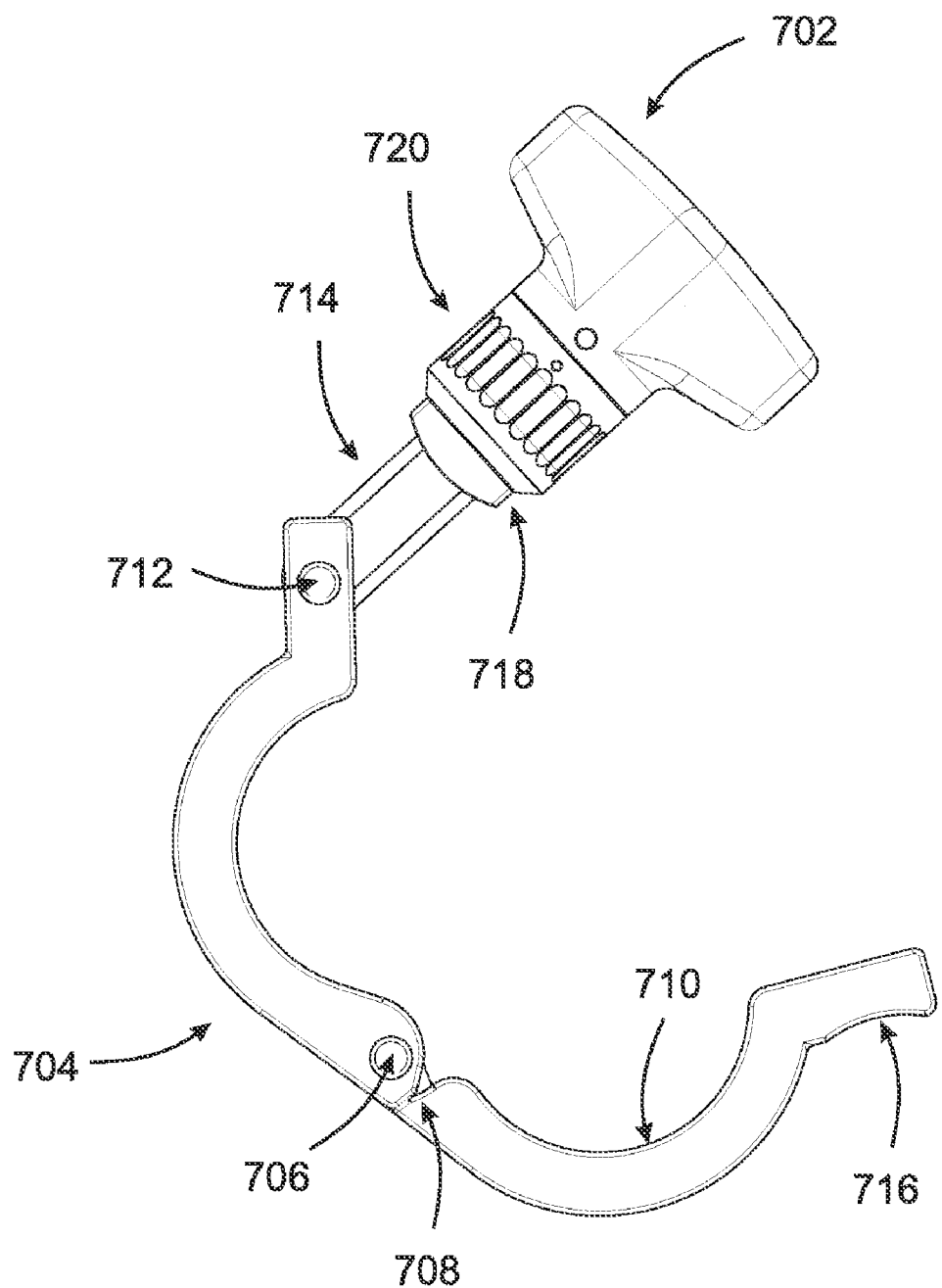
FIG. 9 is a side view of the improved Tri-Clamp device of FIG. 7 in the open position.
Figure 10:
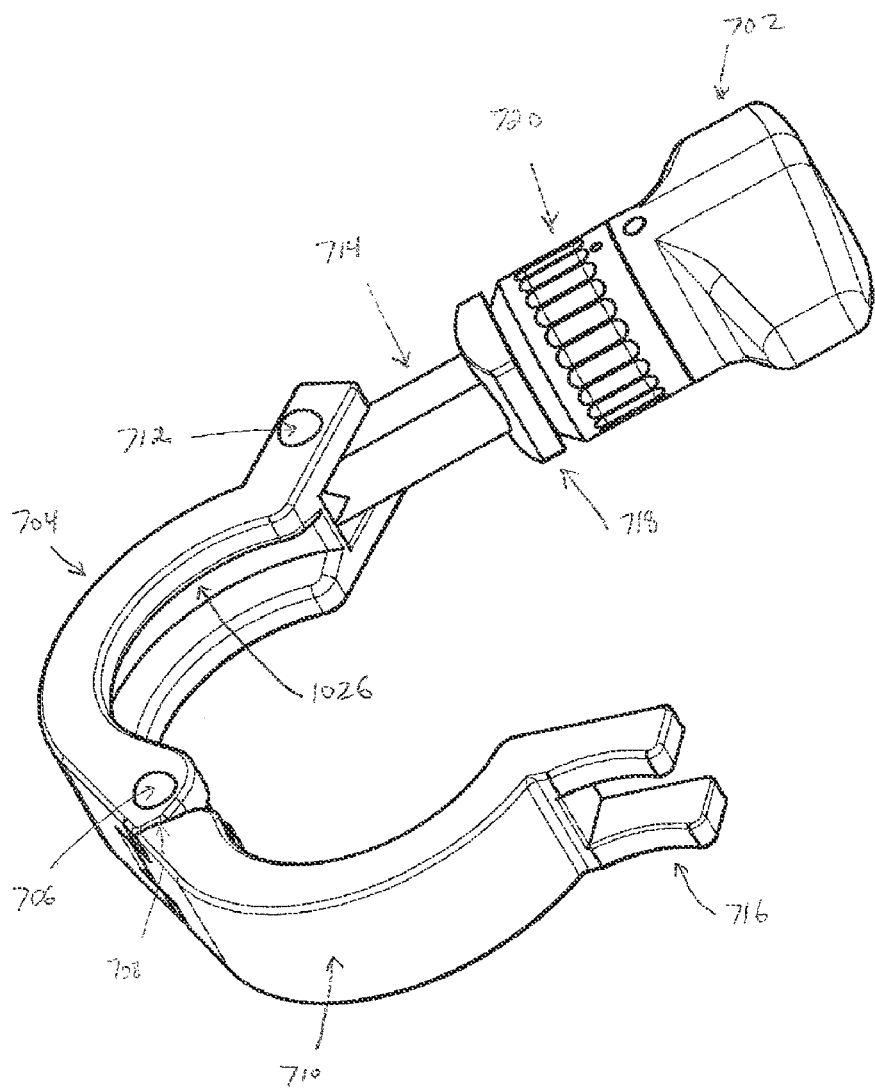
FIG. 10 is a perspective view of the improved Tri-Clamp device of FIG. 7 in the open position.

With reference to FIGS. 9 and 10, side view and perspective views respectively of the embodiment of FIG. 8 are shown in the open position. Shown are upper clamp ring 704, lower clamp ring 710, hinge joint 706, clamp ring pivot stop 708, shaft 714, pivot joint 712, curved tines of slotted opening 716, curved engagement block 718, fine adjustment mechanism 720 and coarse winding mechanism 702. Also shown is slotted grove 1026 on the surface of the inner diameter of upper clamp ring 704.

Figure 10A:
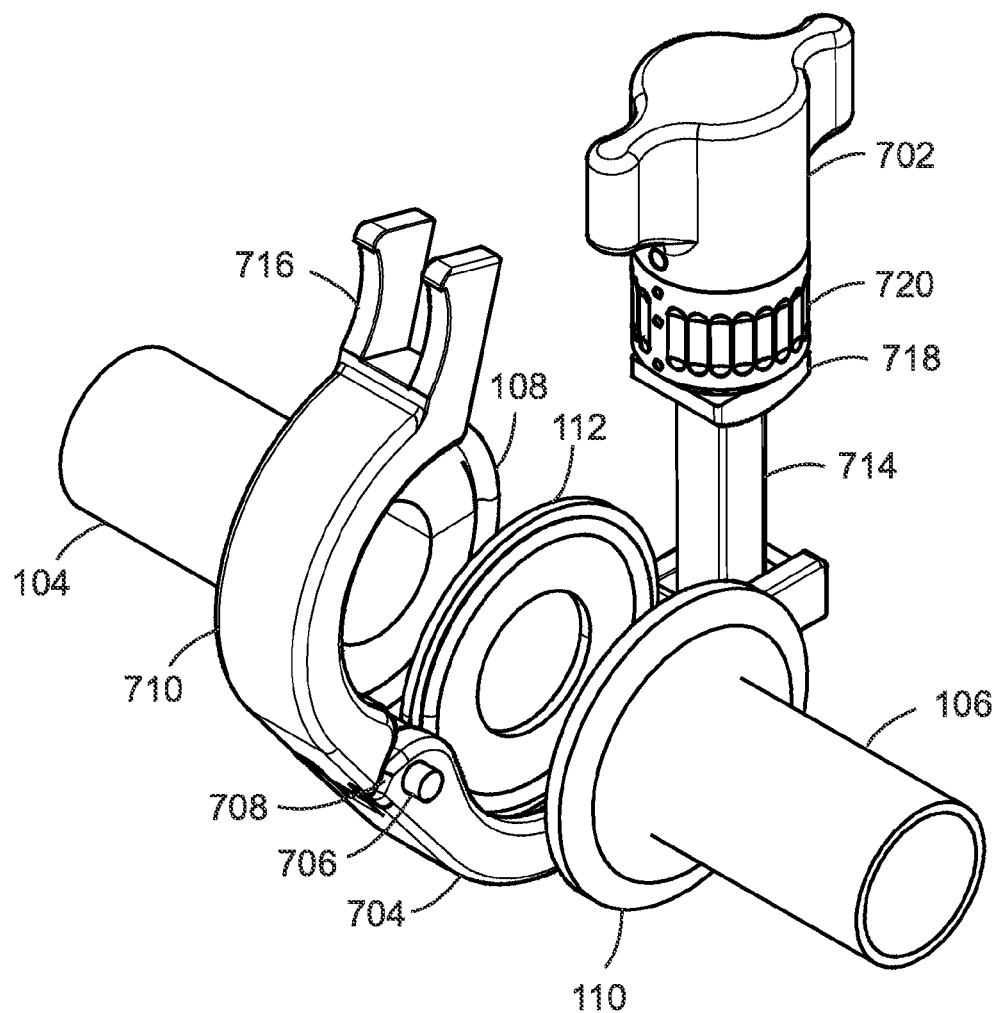
FIG. 10A is a perspective view of the improved Tri-Clamp device of FIG. 7 shown in relationship to the fluid tubing of FIG. 1.

FIG. 10A is a perspective view of the embodiment of FIGS. 7-10 shown in relationship with the fluid tubing 104, 106 of FIG. 1.

In operation the lower clamp ring 710 pivots from the open position to the closed position, and shaft 714 pivots in to be received in the curved tines of slotted opening 716. Then, curved engagement block 718 is driven forward to securely engage against the curved tines as a result of a half turn rotation of the coarse winding mechanism 702, thus securing the clamp. The fine adjustment mechanism 720 can be dialed to a particular click position to optimize the clamping force for a particular tubing combination during an initial clamping. The fine adjustment setting 720 can later be as modified, typically infrequently, as the gaskets compress or if the clamp is to be used to connect a different tubing combination. To subsequently open the clamp, this sequence of events occurs in the reverse order, beginning with rotation of the winding mechanism 702 in the opposite direction.

In some embodiments the clamp is sized to accommodate standard sizes of tubing sections, including 1 inch, 1.5 inch and 2 diameter sizes, among others.

Figure 11A:
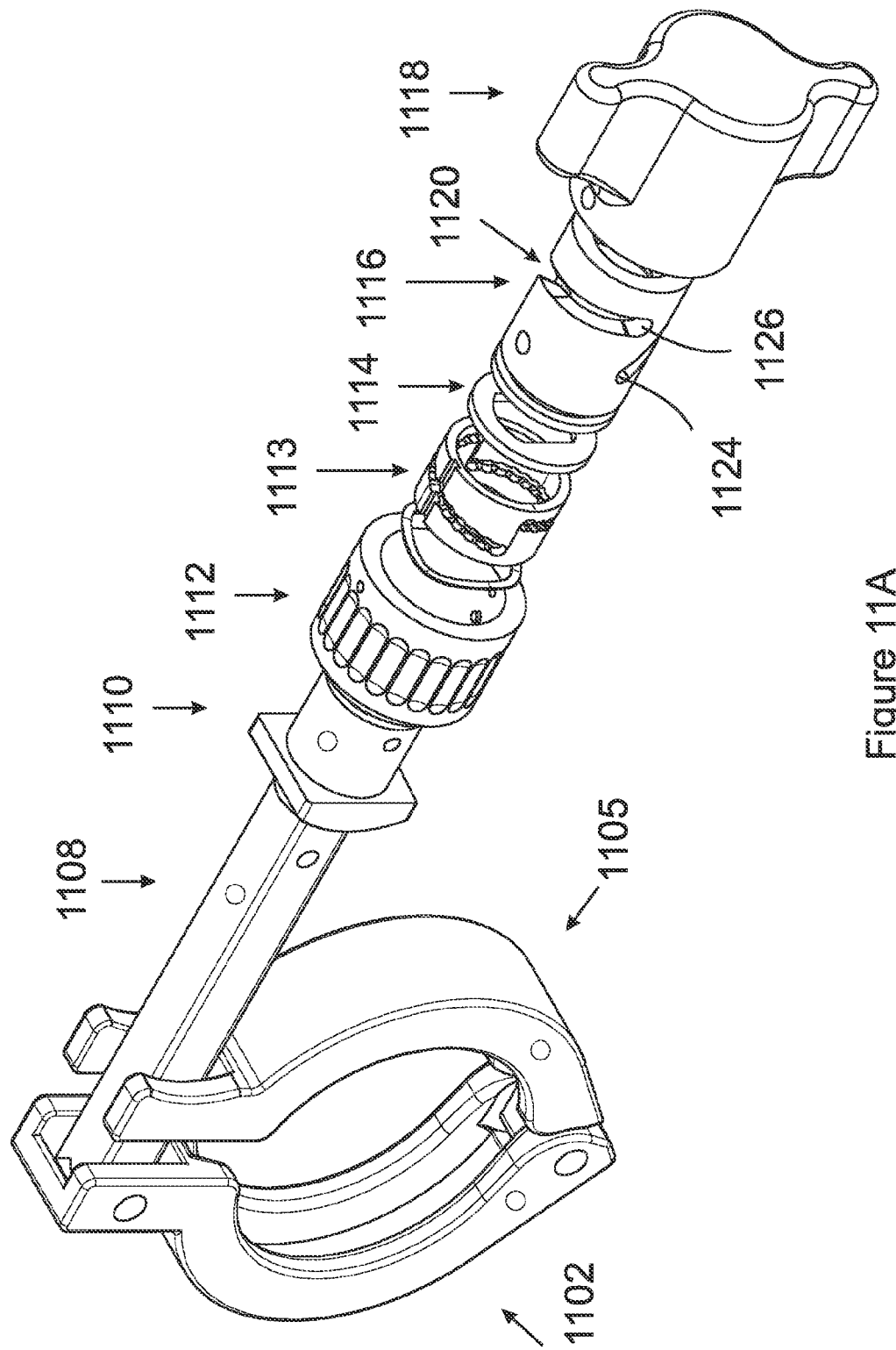
FIG. 11A is a perspective exploded view of the improved Tri-Clamp device of FIG. 7.

With reference to FIG. 11A, an exploded view of the embodiment of FIG. 8 is shown. Illustrated are upper clamp ring 1102, lower clamp ring 1105, shaft 1108, curved engagement block 1110, fine adjustment mechanism 1112 and coarse winding mechanism components comprising internal spring 1114, threaded internal rotation cylinder 1116 and external knob 1118. The embodiment of FIG. 11A is shown in an assembled side view in FIG. 11B.

Figure 11B:
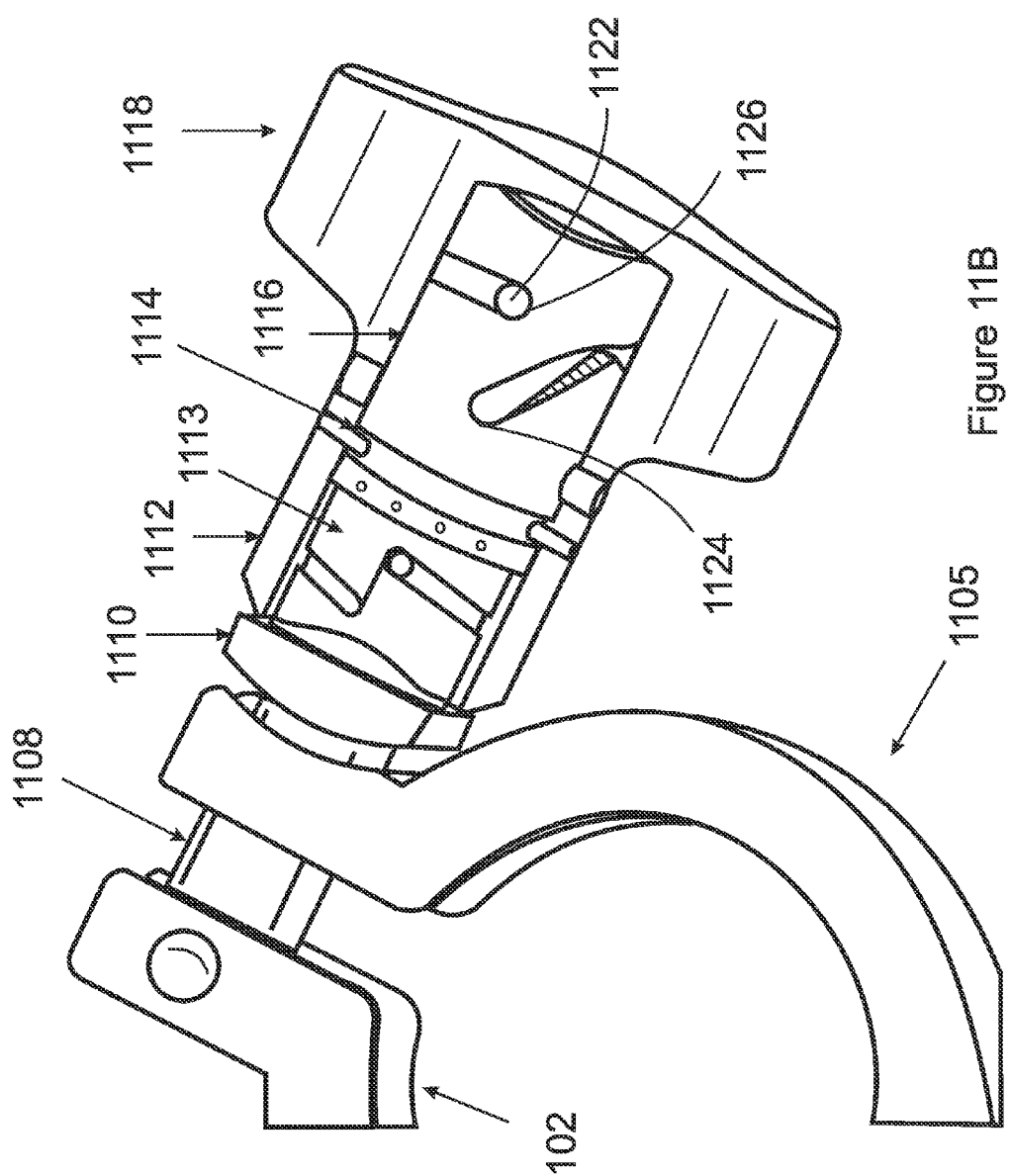
FIG. 11B is an assembled side view of the improved Tri-Clamp device of FIG. 7.

As can be seen in FIGS. 11A and 11B, the internal rotation cylinder 1116 includes a winding slot 1120 in which a pin 1122 travels as the winding mechanism is rotated, thereby causing the winding mechanism and adjustment mechanism 1112 to travel together along the shaft 1108 as the winding mechanism is rotated. Terminating ends 1124, 1126 of the winding slot 1120 prevent the winding mechanism from rotating beyond a proximal winding limit 1124 and a distal winding limit 1126 as the pin 1122 reaches the ends 1124, 1126 of the winding slot 1120. Rotation of the adjustment mechanism 1112 relative to the winding mechanism adjusts the distance between the curved engagement block 1110 and the winding mechanism, thereby adjusting the amount of pressure that is applied by the engagement block 1110 to the lower clamping ring 1105 when the winding mechanism reaches the distal winding limit.

As will be realized, the rapid and efficient tightening and locking adjustment features described in the above embodiments of the invention may be applied to a wide range of devices in addition to clamps. For example, various machine tools such as turning and milling machines, both manual and computer controlled, require numerous adjustments during the setup process. These adjustments may be performed more easily and efficiently with the tightening and locking features described above in connection with embodiments of the present invention. Similarly, many types of hand tools and power tools, such as routers, table saws and chop saws, require tightening and locking adjustments of various components, and are amenable to improved operation due to embodiments of the present invention.

As will be realized, the invention is capable of other and different embodiments, and its several details are capable of modifications in various obvious respects, all without departing from the essence of the invention. For instance, the invention may be practiced as an apparatus and/or process, and can be scaled.

There is within the scope of the invention, a coupling device for connecting sections of fluid tubing comprising an upper clamp ring and a lower clamp ring attached to the upper clamp ring at a hinge joint, allowing the upper clamp ring and the lower clamp ring to rotate about the hinge joint between an open position and a closed position.

The coupling device further includes a catch mechanism having a lower end fitted through an opening in the lower clamp ring, the catch mechanism having an upper end extending beyond the opening in the lower clamp ring and extendable into a receiver opening in the upper clamp ring.

The coupling device further includes a latch located within the receiver opening, a hooked paw on the upper end of the catch mechanism configured for engaging with the latch during an initial closure of the coupling device, thereby providing a first, loosely latched condition, a spring located in the receiver and configured to encourage engagement of the hooked paw with the latch during the initial closure into the loosely latched condition, a winding mechanism attached to the lower end of the catch mechanism and rotatable over a limited range about an axis of the catch mechanism so as to move the catch mechanism up and down along the axis of the catch mechanism, thereby retracting the catch mechanism and fully securing the latch when the winding mechanism is rotated so as to move the catch mechanism in the down direction, and thereby releasing the catch mechanism and returning the coupling device to the loosely latched condition when the winding mechanism is rotated so as to move the catch mechanism in the up direction, and a spring loaded pivot point in the lower clamp ring about which the winding mechanism and catch mechanism can be rotated to engage and disengage the coupling device from the loosely latched condition, wherein the spring loading encourages the engagement of the hooked paw with the latch.

The coupling device may further comprise a clamp ring pivot stop to limit the range of rotation about the hinge joint in the open position. The winding mechanism may require no more than one full turn clockwise to fully secure the latch and no more than one full turn counter-clockwise to release the catch mechanism. In some embodiments the winding mechanism may need no more than one quarter turn counter-clockwise to release the catch mechanism. There may be a restraint mechanism to prevent unintentional rotation of the winding mechanism causing unintentional release of the coupling device.

The attachment of the winding mechanism and the catch mechanism may be accomplished with a threaded rod on the winding mechanism and a threaded receiver on the catch mechanism, and the threading may be an ACME thread to provide smooth and rapid motion of the catch mechanism in response to rotation of the winding mechanism.

In some embodiments, the latching mechanism operates as a two-step process. The first step provides a quick, loose initial joining of the tube sections which holds the clamp loosely in place around the joint and keeps the joint and gasket from falling apart or out of alignment. The second step provides for tightening and securing the latch around the joint so that the gasket is properly and uniformly compressed and the butt joint is fully operational for passing fluid between the tube sections.

In some embodiments the device may be fabricated from stainless steel, and in particular 316L stainless steel may be used. In other embodiments, which may be suited to one-time use, the device may be fabricated from plastic, Teflon, Nylon or any other suitable material. The coupling device may be suitable for use in a sanitary system.

There is further within the scope of the invention, a method for coupling connecting sections of fluid tubing comprising attaching a lower clamp ring to an upper clamp ring at a hinge joint, allowing the upper clamp ring and the lower clamp ring to rotate about the hinge joint between an open position and a closed position, providing a catch mechanism having a lower end fitted through an opening in the lower clamp ring, and the catch mechanism having an upper end extending into a receiver in the upper clamp ring, engaging a hooked paw on the upper end of the catch mechanism with a latch in the receiver during an initial closure, providing a first, loosely latched condition, providing a spring in the receiver to encourage the engagement of the hooked paw to the latch during the initial closure into the loosely latched condition, attaching a winding mechanism to the lower end of the catch mechanism and rotatable over a limited range in an up-and-down direction along the axis of the catch mechanism, to retract the catch mechanism to fully secure the latch by rotating in the down direction and to release the catch mechanism to the loosely latched condition by rotating in the up direction, and providing a spring loaded pivot point in the lower clamp ring about which the winding mechanism and catch mechanism rotate to engage and disengage from the loosely latched condition, wherein the spring loading encourages the engagement into the loosely latched condition.

In some embodiments the method may limit the range of rotation about the hinge joint in the open position through the use of a clamp ring pivot stop. In some embodiments the method may require no more than one full turn clockwise of the winding mechanism to fully secure the latch and no more than one full turn counter-clockwise to release the catch mechanism. Some further embodiments may require no more than one quarter turn counter-clockwise to release the catch mechanism.

In some embodiments the method may provide a restraint mechanism to prevent unintentional rotation of the winding mechanism causing unintentional release of the coupling device. The upper clamp ring and the lower clamp ring may have a slotted grove on the surface of the inner diameter to receive and secure a gasket and a flanged end of tubing to be connected by the coupling device. The method may be used in a sanitary fluid system.

There is further within the scope of the invention a coupling device for connecting sections of fluid tubing comprising an upper and lower clamp ring as described previously, a shaft having an upper end that is connected to the upper clamp ring at a pivot joint, a mid-section that slides into curved tines of a slotted opening in the lower clamp ring, and a lower end which enters into an opening in a curved engagement block. The device further comprises a fine adjustment mechanism attached to the curved engagement block which rotates over a limited range causing the shaft to move relative to the engagement block up-and-down along the direction of the shaft axis to securely engage the curved engagement block against the curved tines during device closure. The fine adjustment mechanism may also have a number of preset adjustment positions with associated click stops along the range of rotation. The device further comprises a coarse winding mechanism attached to the fine adjustment mechanism, also rotatable over a limited range causing a similar but coarser motion of the shaft in the up-and-down direction to secure the clamp during device closure. The fine adjustment mechanism may enable relative movement of the shaft and engagement block within an approximate range of 60 thousandths of an inch to 70 thousandths of an inch. The coarse winding mechanism may secure the clamp with a rotation of approximately one half turn or less.

There is further within the scope of the invention a method for coupling connecting sections of fluid tubing comprising attaching a lower clamp ring to an upper clamp ring at a hinge joint, allowing the upper clamp ring and the lower clamp ring to rotate about the hinge joint between an open position and a closed position; providing a shaft having an upper end pivotally connected to the upper clamp ring, a mid-section which is received into curved tines of a slotted opening in the lower clamp ring, and a lower end extending in to a receiver in a curved engagement block; attaching a fine adjustment mechanism to the curved engagement block and rotatable over a first limited range in an up-and-down direction along the axis of the shaft to securely engage the curved engagement block against the curved tines of the slotted opening in the lower clamp ring during device closure; and attaching a coarse winding mechanism to the fine adjustment mechanism and rotatable over a second limited range in an up-and-down direction along the axis of the shaft to securely engage the curved engagement block against the curved tines of the slotted opening in the lower clamp ring during device closure. The fine adjustment mechanism may click into a number of preset adjustment positions along its range of rotation and may enable movement of the engagement block relative to the shaft in an up-and-down direction along the axis of the shaft within an approximate range of 60 thousandths of an inch to 70 thousandths of an inch. The coarse winding mechanism may secure the clamp in a closed position with a rotation of approximate a half turn or less.

There is further within the scope of the invention a coupling device for connecting sections of fluid tubing comprising: an upper clamp ring; a lower clamp ring attached to the upper clamp ring at a hinge joint, allowing the upper clamp ring and the lower clamp ring to rotate about the hinge joint between an open position and a closed position; and an engagement mechanism to securely tighten the upper clamp ring and the lower clamp ring about the fluid tubing connection in response to force applied by a winding mechanism.

There is further within the scope of the invention an adjustable tightening device comprising: a shaft having an axis, a distal end which is connectable to an object to be secured, and a proximal end which is insertable into a receiving object, a winding mechanism cooperative with the distal end of the shaft and rotatable over a limited winding range so as to move an engagement surface along the axis of the shaft between an engaged position and an unengaged position, the engagement surface in the engaged position being able to apply to the receiving object a force which is sufficient for securely engaging the connectable object with the receiving object, and an adjustment mechanism cooperative with the engagement surface, the adjustment mechanism being rotatable so as to adjust the size of the limited winding range, thereby adjusting the amount of rotation of the winding mechanism that is required to transition the engagement surface from the unengaged position to the engaged position.

In some embodiments, the winding mechanism requires no more than one full turn to fully secure the latch. In other embodiments the winding mechanism requires no more than one full turn to release the catch mechanism. And various embodiments further include a restraint mechanism configured to prevent unintentional rotation of the winding mechanism causing unintentional release of the coupling device.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A coupling device for connecting sections of fluid tubing comprising:
    an upper clamp ring;
    a lower clamp ring attached to the upper clamp ring at a hinge joint, allowing the upper clamp ring and the lower clamp ring to rotate about the hinge joint and to surround abutting flanged ends of the fluid tubing;
    a shaft having a distal end pivotally connected to the upper clamp ring, a mid-section which is receivable into a slotted opening in the lower clamp ring, and a proximal end extending below the slotted opening when the mid-section is inserted in the slotted opening;
    a winding mechanism cooperative with the proximal end of the shaft and rotatable from a proximal winding limit to a distal winding limit so as to move an engagement surface along an axis of the shaft toward the lower clamp ring until the engagement surface applies to the lower clamp ring a force which is sufficient for securely engaging the upper clamp ring with the lower clamp ring, thereby firmly joining together the sections of fluid tubing, the winding mechanism being configured to maintain the winding mechanism on the shaft and to prevent rotation of the winding mechanism beyond the proximal and distal winding limits; and
    an adjustment mechanism cooperative with and disposed between the engagement surface and the winding mechanism, the adjustment mechanism being rotatable relative to the winding mechanism so as to adjust a distance between the engagement surface and the winding mechanism, thereby adjusting the amount of force applied by the engagement surface to the lower clamp ring when the winding mechanism is rotated to the distal winding limit.

2. The coupling device of claim 1, wherein the adjustment mechanism clicks into a plurality of preset adjustment positions about a limited range of adjustment rotation.

3. The coupling device of claim 1, wherein rotation of the adjustment mechanism is able to move the engagement surface along the axis of the shaft over a limited adjustment range, the limited adjustment range having a magnitude of between 60 thousandths of an inch and 70 thousandths of an inch.

4. The coupling device of claim 1, wherein no more than one half turn of the winding mechanism is required to move the winding mechanism between the proximal winding limit and the distal winding limit.

5. The coupling device of claim 1, further comprising a clamp ring pivot stop configured to limit the range of rotation of the upper clamp ring and the lower clamp ring about the hinge joint in the open position.

6. The coupling device of claim 1, wherein slotted grooves are provided in the inner diameters of both the upper and lower clamp rings, the slotted grooves being configured to receive and secure a gasket between flanged ends of the sections of fluid tubing.

7. The coupling device of claim 1, wherein the coupling device is suitable for use in a sanitary fluid system.

8. The coupling device of claim 1, wherein the coupling device is made from one of stainless steel, plastic, and nylon.

* * * * *